March 11, 1952 C. A. LOVELL ET AL 2,588,397
SPACED-PULSE IMPULSE SENDER
Filed June 29, 1948 2 SHEETS--SHEET 1

INVENTORS: C. A. LOVELL
D. B. PARKINSON
BY William F. Simpson.
ATTORNEY

March 11, 1952 C. A. LOVELL ET AL 2,588,397

SPACED-PULSE IMPULSE SENDER

Filed June 29, 1948

2 SHEETS--SHEET 2

INVENTORS: C. A. LOVELL
D. B. PARKINSON

BY William F. Simpson.

ATTORNEY

Patented Mar. 11, 1952 2,588,397

UNITED STATES PATENT OFFICE 2,588,397

SPACED-PULSE IMPULSE SENDER

Clarence A. Lovell, Summit, and David B. Parkinson, Maplewood, N. J., assignors to Bell Telephone Laboratories, Incorporated, New York, N. Y., a corporation of New York Application June 29, 1948, Serial No. 35,927

16 Claims. (Cl. 179—90)

This invention relates to signaling apparatus and more specifically to telephone signaling apparatus of the pre-set type which generates pulses of electric current which may be transmitted over voice frequency channels.

In the usual type telephone signaling apparatus each digit is selected and transmitted in sequence and the selection of each successive digit cannot be made until the signal pulses representing the preceding digit have been transmitted, thereby requiring an appreciable amount of time and presenting numerous opportunities for the subscriber or operator to err. Each sequence of signaling pulses representing a called number is transmitted only once, so if any error occurs in the selection or transmission, a wrong number will result. Furthermore, the usual type telephone signaling apparatus employs representations of digits comprising interruptions of direct current which must be transmitted over a direct current or an extremely low frequency transmission channel. Pulses of this type cannot be transmitted directly over the usual voice frequency channels and repeaters as employed in telephone systems. Also, the usual telephone central office switching systems require the signals to be stored in expensive and complicated equipment to be subsequently transmitted to another switching center, and often this process must be repeated several times.

An object of this invention is to provide signaling equipment in which the entire number to be called may be set by the subscriber or operator prior to initiating the call and in which the signals representing the number are generated at a high rate of speed. Such an arrangement reduces the time and attention required by the subscriber or operator, reduces the opportunity for error, and reduces the holding time of the equipment at the switching center, thereby materially reducing the cost of handling calls. Another object of this invention is to provide signaling equipment for generating pulses suitable for transmission over voice frequency communication channels and in which the pulses representing the called number may be repeatedly transmitted without further attention on the part of the subscriber or operator, thereby permitting the use of central office switching systems which complete the desired connection without requiring the signals to be stored. By generating pulses which may be transmitted over a voice frequency transmission path and repeating the entire number over and over, it is possible to transmit the number from a subscriber station to each of the switching devices or stations necessary to extend the transmission path to the called subscriber station.

A feature of this invention relates to signaling apparatus for generating pulses in which the magnitude of each digit of the number called is represented by the time elapsing between a reference or start pulse and a stop or digit pulse. In transmitting pulses of short duration over voice frequency transmission paths, difficulty is frequently encountered due to transients set up by the pulses. The transients are usually decaying alternating currents which are caused by resonant circuits encountered in the transmission paths, repeat coils, filters, and other transmission equipment. Transients resulting from the application of short pulses to such equipment frequently last a number of cycles and thus for an appreciable interval of time after the exciting pulse has terminated. This invention discloses apparatus adapted to space the signaling pulses so that ample time is allowed for the transients associated with or appearing incident to the application of each of the signaling pulses to the transmission system to die out sufficiently so that they will not interfere with the next signaling pulse. In this manner it is possible to prevent interaction between the various pulses representing the digits of the called number so that the number may be correctly received by the equipment at the central switching station.

These and other objects and features of the invention will be apparent from the following description, the appended claims, and the drawings, in which:

Figure 1:
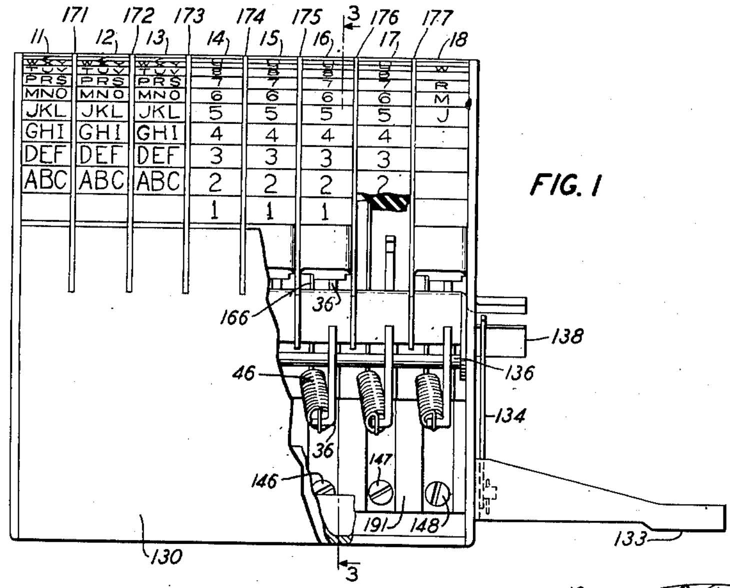
Fig. 1 is a front view, partially broken away, of the dialing apparatus.

The manner in which the apparatus disclosed in this application may be incorporated in a complete telephone system is disclosed in copending application Serial No. 35,925, filed June 29, 1948 of W. A. Malthaner. Suitable types of equipment for responding to the signaling pulses transmitted from the apparatus disclosed herein is disclosed in the copending applications of H.

E. Vaughan; Serial No. 35,911, filed June 29, 1948, and W. A. Malthaner, N. D. Newby, and H. E. Vaughan, Serial No. 35,924, filed June 29, 1948.

A similar signaling device, upon which the arrangement herein disclosed may be considered an improvement, is disclosed in copending applications Serial No. 35,930, filed June 29, 1948 of D. B. Parkinson and Serial No. 35,926, filed June 29, 1948 of C. A. Lovell and D. B. Parkinson. Reference may be made to application Serial No. 35,930, filed June 29, 1948 of D. B. Parkinson for a more detailed description of the time relationship between the various pulses.

In accordance with an exemplary embodiment of the present invention the signaling pulses are generated by discharging a condenser through the primary winding of a transformer. The secondary windings of the transformer are connected across the telephone line so that the pulses are impressed directly across the line. The signaling apparatus is provided with a small electric motor which may be energized with current from a telephone line which interconnects the apparatus with the central switching office. The motor is of special construction wherein the transformer used to transmit the pulses may employ the same core as the motor and the secondary winding of the transformer may be one phase winding of the motor. The motor is employed to drive a rotor comprising a single permanent magnet, and this magnet is rotated past the various reed switches at predetermined times. The reed switches may be the usual type comprising two closely spaced members made of magnetic material enclosed in a glass container which is filled with a non-oxidizing gas. Each reed switch is momentarily closed each time the permanent magnet is brought in close proximity with the switch during each revolution of the magnet. Each time a reed switch closes, a circuit may be completed which will cause a condenser to discharge and will cause a surge of current to flow in the primary winding of the transformer. This surge of current appears across the secondary windings of the transformer as a signaling pulse and is impressed across the signaling line. The pulsing condenser is connected to a source of direct current through a pulse forming network. The source of direct current may be obtained by rectifying the alternating current which energizes the motor. Each revolution of the permanent magnet past all the reed switches corresponds to the time alloted for the generation of pulses representing one digit. The motor also drives distributor elements which operate at a rate of one revolution during the time allotted for the generation of pulses representing the entire number called. If desired, the number will be repeated as long as the motor is operated. A manually operated selector switch is provided for interconnecting the reed switches and the distributor so that pulse representations of any desired number or combination of letters and numbers in accordance with the setting of the selector may be impressed across the telephone line.

In the exemplary embodiment shown, provision is made for the generation of pulse representations of eight characters during each cycle of operation, and these pulses are repeatedly generated as long as the motor operates. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½-milliseconds are required for the longest transients to die out sufficiently so that the succeeding pulse may be accurately recognized without interference from the transient caused by the previous pulse. In other words, each transmitted pulse of approximately 1-millisecond duration is in effect lengthened to a decaying alternating current of approximately 3½-milliseconds duration. At the end of this 3½-millisecond period or any time thereafter a second pulse may be transmitted.

The signaling system employed in this embodiment of the invention comprises a start pulse of about 1-millisecond duration for each character, the start pulses being generated at 12½-millisecond intervals as long as the motor is running, and a stop pulse of about 1-millisecond duration for each character, each stop pulse starting during the 4 to 8½-millisecond interval of time after the start of the start pulse. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which is initiated 4 milliseconds after the start pulse was initiated, digit 2 is represented by a start pulse followed by a stop pulse which is initiated 4½ milliseconds after the start pulse was initiated, and so on. It will be observed that the stop pulse for the digit 0 is initiated 8½ milliseconds after its start pulse and 4 milliseconds before the next succeeding start pulse. Thus, there is required an increment of time of 4 milliseconds for the generation and decay of the start pulse, 9 increments of time of ½ millisecond each for the start of the generation of a pulse at any one of the 10 times necessary to represent the various digits, and a last increment of time of 4 milliseconds, all of the latter being required to permit the stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number. In order to indicate the starting point of the transmission of a called number, a time interval of approximately 25 milliseconds is provided at the beginning of each pulse representation of a called number during which no pulses are transmitted. Thus, 125 milliseconds of time are required to transmit the no-signal period and the pulse representations of an eight-unit number.

As discussed hereinbefore, the apparatus disclosed by this invention comprises a pulse generator, a distributor synchronized with the pulse generator and a selector switch which interconnects the pulse generator to the distributor so that pulse representations of any eight-unit called number may be impressed across the telephone line.

Figures 2, 3:
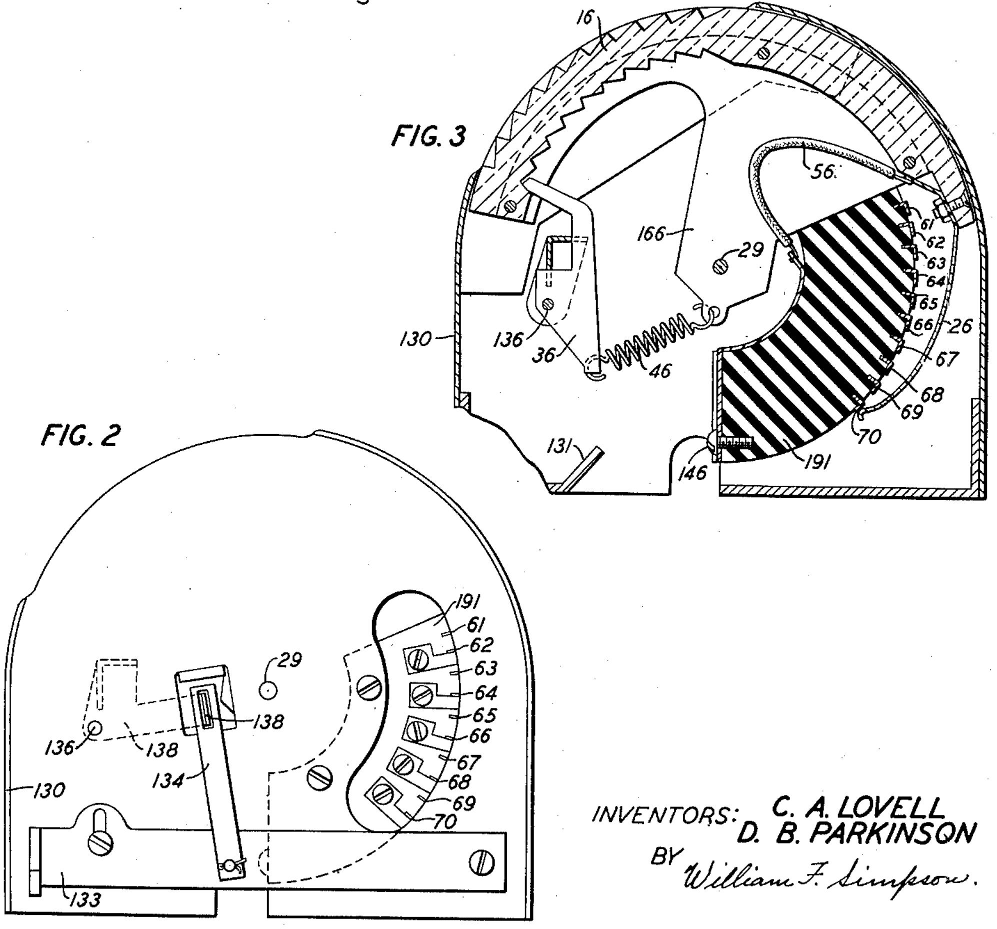
Fig. 2 is a side view of the same apparatus.
Fig. 3 shows a section taken along section line 3 of Fig. 1.

Figs. 1, 2 and 3 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit a person's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations on the dials an operator can move the dial in either direction and so that the ratchet action of the pawl against the grooves secures the dial in any of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

Figure 6:
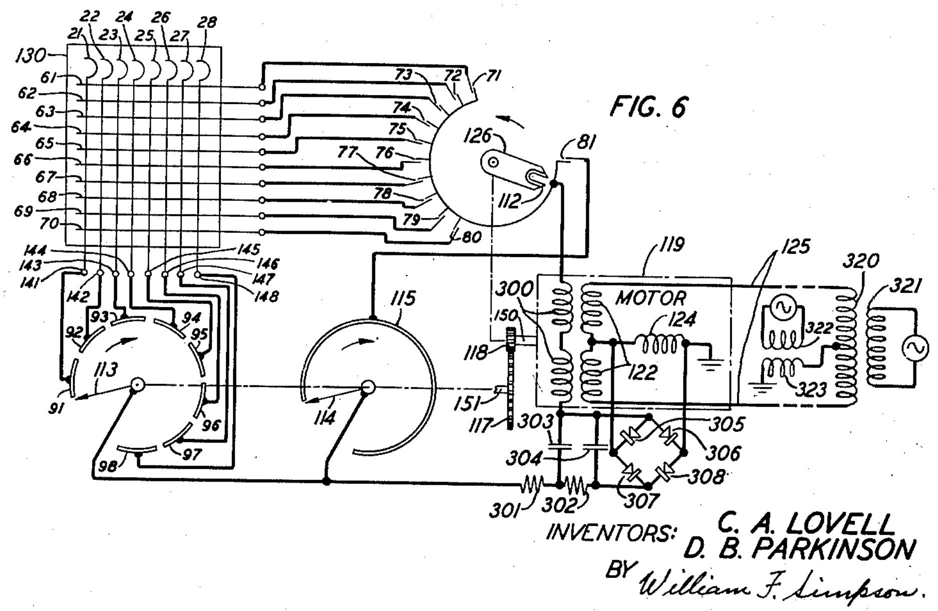
Fig. 6 shows the manner in which the dial, the various reed switches, the motor, and other equipment are interconnected to cooperate one with another and with the telephone line.

Terminals 141 to 148 are connected to commutator segments 91 to 98 and conductors 61 to 70 are connected to reed switches 71 to 80 as indicated in Fig. 6 wherein selector switch 130 is indicated in schematic form.

Figures 4, 5:
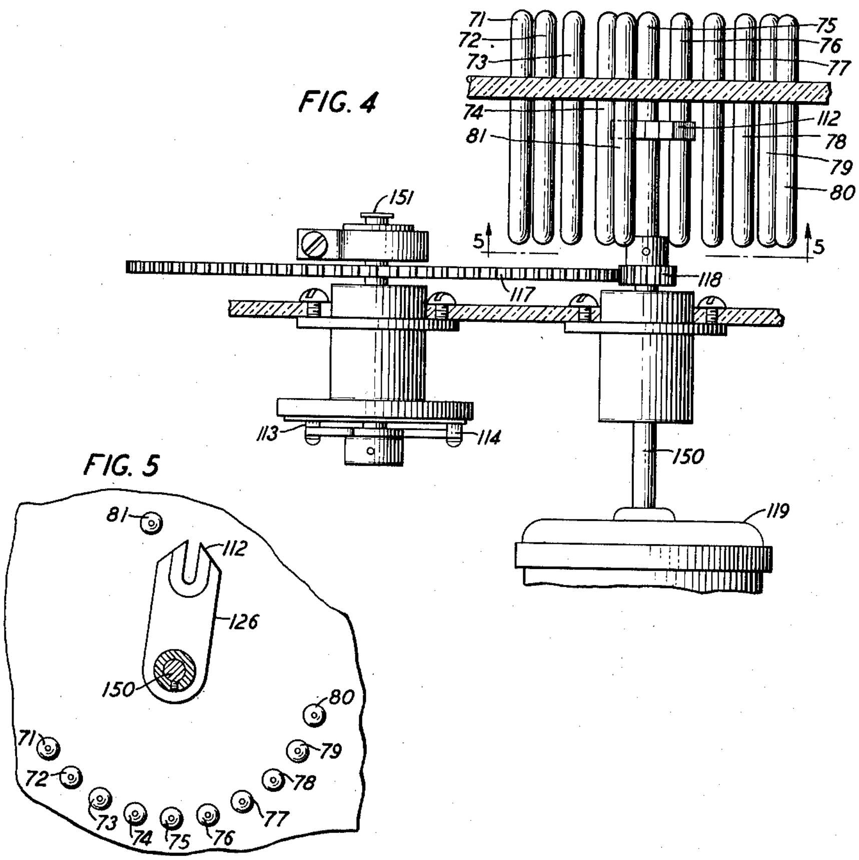
Fig. 4 is a top view showing the motor and the various elements which are driven by the motor as well as the reed switches and manner in which the motor driven magnet is passed by the reed switches.
Fig. 5 shows a section taken along section line 5 of Fig. 4.

The driving motor, pulse generating apparatus and distributors are also indicated in schematic form in Fig. 6, and the mechanical features of these elements are indicated in Figs. 4 and 5.

In the embodiment of this invention disclosed in Fig. 6, motor 119 is a synchronous two-phase type wherein winding 124 is one phase winding and winding 122 is the other phase winding. In order to supply power to the motor over a telephone line, the well-known simplex circuit is employed. In the simplex circuit, alternating current to energize winding 122 is applied directly across line conductors 125 through the transformer comprising windings 320 and 321, and alternating current to energize winding 124 is applied between the two line conductors and ground. In the latter case the interconnection between the source of alternating current and the two line conductors is through the transformer comprising windings 322 and 323 and through a simplex coil 320 having similar electrical properties to winding 122; an alternating current is applied between the center tap of the coil and ground, and each end of the coil is connected to the line. Thus, the power to energize winding 124 passes through each half of simplex coil 320 at the central office, over line 125, and through each half of winding 122 to winding 124.

It is essential that motor 119 operate at substantially constant speed. Therefore, if it is desired to use any other motor than a synchronous type, provision must be made to regulate the motor speed. It will be apparent to one skilled in the art that various arrangements are feasible for supplying power for operating the motor locally.

As discussed above, windings 122 and 124 comprise the two phase windings of motor 119, and phase winding 122 and auxiliary winding 300 comprise a transformer which utilizes the same core as winding 122 of the motor uses. Although these windings are shown separate from the motor structure for convenience, it will be understood that they are within the housing of motor 119.

Rectifiers 305 to 308 are connected across one phase winding of motor 119 and the direct-current output of these rectifiers is applied to the pulse forming network which comprises condensers 303 and 304 and resistors 301 and 302. The electrical constants of this pulse forming network and winding 300 are proportioned so that an electric pulse of approximately 1-millisecond duration is applied to winding 122 and line 125 when one of the reed switches places an instantaneous short circuit across serially connected winding 300 and the pulse forming network. Switches 71 to 81 serve to supply these instantaneous short circuits at predetermined times in accordance with the signaling code.

Motor 119 drives shaft 150 which is directly connected to rotor 126 and gear 118. Gear 118 drives gear 117 which is in turn connected to shaft 151 which is connected to rotors 113 and 114 of the distributor. The gears are proportioned so that shaft 151 rotates at one-tenth the speed of shaft 150.

Rotor 126 contains magnet 112 mounted on its outer extremity. Reed switches 71 to 81 are mounted in a fixed annular pattern around rotor shaft 150 in such manner that each time the shaft makes a revolution magnet 112 is caused to successively pass in close proximity with each switch and thereby cause each switch to close for an instant. During each of the eight revolutions of rotor 126 required to generate an eight-unit called number, each of the reed switches 71 to 81 close for an instant. However, as a result of the position of the various contacts of selector switch 130 and the action of rotors 113 and 114, only switch 81 and one of the switches 71 to 80 are connected across the transformer and pulsing network during each of the eight revolutions of magnet 112.

Magnet 112 is moved at a speed which causes it to make one revolution in approximately 12½ milliseconds. The repeated closures of switch 81 serve to generate the start pulse for each digit. Switches 71 to 80 are evenly spaced around the rotor shaft and are positioned so that the pulses generated by the closure of switch 71 occur approximately 4 milliseconds after the pulses generated by the closure of switch 81 occur and so that the pulses generated by the closure of switches 72 to 80 occur at successive times of one-half millisecond after the pulse generated by the closure of switch 71. One contact of each of the switches is connected to the upper end of winding 300. The other contact of each of the switches 71 to 80 may be connected to the lower end of winding 300 through selector switch 130, distributor rotor 113 and the pulse forming network. The other contact of switch 81 may be connected to the lower end of winding 300 through rotor 114 and the pulse forming network.

The distributor rotors are eared to the motor so as to rotate at one-tenth the speed of the magnet rotor. Rotor 126 revolves ten times and rotors 113 and 114 revolve one time during the generation and transmission of pulse representations of a called number made up of eight characters. The three rotors are synchronized so that rotor 114 contacts conductor 115 and thereby connects switch 81 to the pulse forming network and so that rotor 113 connects successively to commutator segments 91 to 98 during the time required to generate the signaling pulses representing the called number. Each commutator segment is connected to one of the selector switch spring contacts such as contact 28 indicated in Fig. 3. Thus, the setting of selector switch 130 and the position of rotor 113 determines which switch of switches 71 to 80 is connected across winding 300 and the pulse forming network during each revolution of rotor 126. It will be observed that this method of selectively connecting the reed switches across winding 300 and the pulse forming network determines the time relationship between each start and each stop pulse. During the final portion of each revolution of rotors 113 and 114 there is an interval during which neither rotor connects a switch contact to the pulse forming network, and, as discussed hereinbefore, this interval during which no pulses are transmitted allows the position of the various characters in the number to be recognized and enables the central office switching equipment to properly respond to the number. During this interval rotor 126 revolves two times, but no pulses are generated since all the reed switches are disconnected from the pulse forming network by rotors 113 and 114.

Motor 119 may start driving the three rotors from any of the various positions in which they may stop, consequently the first series of pulses transmitted will not ordinarily represent the complete number which is to be called. As disclosed in copending application Serial No. 35,925, filed June 29, 1948 of W. A. Malthaner, the central office switching equipment is designed to reject the signaling pulses unless the correct number of pulses is received between each no-signal period. Also, the no-signal period preceding each group of pulses must be of a certain duration before the central office equipment will respond.

The signaling apparatus disclosed herein may be used as part of a subscriber's telephone station or as part of a central office operator's equipment. Ordinarily it will be desirable to interpose a manually operable switch between the apparatus as disclosed and the telephone line. This switch would serve to place the station in condition to receive a call when in its normal position, and to place the station in condition to generate and transmit signaling pulses when in its operated position. It is apparent that the selector switch 130 could be modified so as to include a telephone handset cradle and switch of conventional design. In this case the switch would be in its normal unoperated condition while the handset is resting in its cradle, and it would be operated when the handset is removed.

Under some circumstances it may be desirable to provide for the continuous operation of motor 119 and employ a separate switch for connecting the pulsing coils across the line.

In using the signaling apparatus the subscriber or operator will first position dials 11 to 18 so that the number to be called appears on a horizontal line slightly above the front face of case 130. It is to be observed that the operator has this number before him at all times and may check it at any time before, during or after the call. The operator will then cause the signaling pulses to be transmitted by switching the signaling apparatus across the line.

While motor 119 is energized it will cause rotors 113, 114 and 126 to revolve continuously. As these rotors revolve, a series of start pulses will be transmitted and each start pulse will be followed by a stop pulse as determined by the setting of selector switch 130. Each series of signaling pulses will be interrupted by a no-signal interval of time of predetermined duration. As long as motor 119 is energized it will rotate continuously and cause pulses representing the called number to be continuously repeated and transmitted over the line.

These pulses are transmitted over the line to a central switching station where they are received and recorded by equipment such as disclosed in copending application Serial No. 35,911, filed June 29, 1948 of H. E. Vaughan or Serial No. 35,924, filed June 29, 1948 of W. A. Malthaner, N. D. Newby and H. E. Vaughan. At the completion of the setting up of a path to a called station, the circuits of the called station and the central office will operate in a manner similar to that set forth in copending application Serial No. 35,925, filed June 29, 1948 of W. A. Malthaner, which circuits function to disconnect the pulse generating equipment from the line and connect the calling station's telephone circuit to the line. In addition, the motor may be stopped at this time if it is so desired. At the completion of the call or before the next call is made the dials are returned to their normal position as indicated in Fig. 1 by pressing release lever 133. After this has been done the apparatus is again in condition to be positioned and operated as discussed above.

Although specific embodiments of this invention have been shown and described, it will be understood that modifications may be made therein without departing from the scope and spirit thereof as defined by the appended claims.

What is claimed is:

1. A telephone calling device comprising an electric line, a condenser, means for charging said condenser, interconnecting means including a plurality of switches interconnected between said condenser and said line, apparatus for operating said switches at predetermined times, and circuit means interconnecting said switches and said condenser and said line for abruptly changing the charge on said condenser whereby a plurality of pulses of electric current from said condenser are transmitted over said line.

2. A telephone calling device comprising a voice frequency transmission path, a condenser, means for charging said condenser, a plurality of switches, and apparatus including said switches for discharging said condenser at predetermined times, interconnecting means including a path for the transmission of electrical energy from said condenser to said voice frequency transmission path for the transmission of two pulses of electric current over said transmission path to represent each character of a called number.

3. A signaling apparatus comprising an electric line, a motor operative from power transmitted over said line, a condenser, means for charging said condenser, interconnecting means including a plurality of switches, means for operating said switches under the control of said motor, said interconnecting means extending between said switches and said condenser and said line to discharge said condenser at predetermined times, and means for transmitting a pulse over said line incident to each discharge of said condenser.

4. A signaling apparatus comprising an electric line, a distributor, a condenser, means for charging said condenser, and interconnecting means including a plurality of switches interconnected between said line and said distributor and said condenser for discharging said condenser under control of said distributor and connections extending from said condenser to said line for transmitting a pulse over said line incident to each discharge of said condenser.

5. A signaling apparatus comprising an electric line, a condenser, means for charging said condenser, a distributor, a plurality of switches, magnetic means for successively and repeatedly operating said switches, and interconnecting means between said line and said condenser including said distributor and switches for discharging said condenser under control of said distributor and switches and electric pulse shaping and transmitting means for transmitting an electric pulse over said line incident to each discharge of said condenser.

6. A telephone calling apparatus comprising an electric line, a plurality of switches, a condenser, means for charging said condenser, interconnecting means including said switches interconnected between said condenser and said line, means for discharging said condenser by operating one of said switches at a plurality of regularly recurring intervals of time, and additional means for dsicharging said condenser by operating the remaining switches at predetermined times during each of said intervals of time and means for selectively interconnecting predetermined ones of said remaining switches and said condenser and said line during each of said intervals of time, circuit means including said interconnecting means for enabling the transmission of two pulses over said line during each of said intervals of time.

7. A telephone calling apparatus comprising an electric line, a plurality of switches, means for successively and repeatedly operating said switches, a condenser, means for charging said condenser, interconnecting means including said switches interconnected between said condenser and said line, a distributor, a selector switch for interconnecting said switches with said distributor, means including said distributor and one of said switches for discharging said condenser and generating a pulse in said line at a plurality of regularly recurring intervals of time, and means including said selector switch and said distributor for causing predetermined ones of the remaining switches to discharge said condenser and generate a pulse in said line at predetermined times during each of said intervals of time.

8. In a signaling system a pulsing apparatus comprising a condenser, means for charging said condenser, a plurality of reed switches, magnetic means for successively and repeatedly operating said switches, an electric line, a distributor, a selector switch interconnecting said reed switches with said distributor, means including said condenser and distributor and one of said reed switches for repeatedly transmitting reference pulses through said line, and apparatus including said distributor and said selector switch and the remaining reed switches for transmitting a series of pulses through said line, means whereby each pulse of each series is transmitted at a predetermined time relative to each reference pulse as determined by the position of said selector switch.

9. A signaling apparatus comprising an electric line, a magnet, a plurality of magnetically operable switches, apparatus for rotating said magnet past said switches to operate said switches, a pulse forming network including a condenser, a transformer interconnecting said line with said pulse forming network, and means for selectively interconnecting two of said switches and said transformer and pulse forming network during predetermined revolutions of said magnet for transmitting pulses over said line.

10. A signaling apparatus comprising an electric line, a magnet, a plurality of magnetically operable switches, apparatus for moving said magnet past and in close proximity with said switches to operate said switches, a condenser, means interconnected with said condenser for charging said condenser, a transformer, the secondary of said transformer being connected across said line and the primary being serially connected to said condenser, and means for selectively connecting a plurality of said switches across said serially connected transformer and condenser each time said magnet is moved past said switches for abruptly changing the charge on said condenser and transmitting pulses over said line.

11. A signaling apparatus comprising a start switch, a plurality of stop switches, means for successively closing each switch during each cycle of operation, each cycle of operation recurring at regular intervals of time, a condenser, means for charging said condenser, a transformer, the primary winding of said transformer being connected in series with said condenser, means for connecting said start switch across said serially connected transformer winding and condenser during a predetermined number of said cycles of operation for abruptly changing the charge on said condenser, and means for selectively connecting one of said stop switches across said serially connected transformer winding and condenser during each cycle of said predetermined number of cycles of operation for abruptly changing the charge on said condenser, whereby a pulse of electric potential is generated in the secondary winding of said transformer in response to each of said abrupt changes of charge on said condenser.

12. A pulse generator comprising a magnet, a plurality of reed switches, means for rotating said magnet past said reed switches to actuate said switches, a plurality of distributor segments, means for selectively interconnecting said segments with one terminal of each of said reed switches, a distributor rotor, means for moving said rotor across said segments at a speed directly proportional to the speed of rotation of said magnet, a condenser, means for charging said condenser, circuit means including said reed switches and distributor for discharging said condenser at predetermined times and means interconnected with said circuit means for generating a pulse from each discharge of said condenser.

13. A pulse generator comprising a magnet, a plurality of reed switches, means for rotating said magnet past said switches, a plurality of distributor segments, means for selectively interconnecting said segments and said switches, a distributor rotor, means for moving said rotor across said segments for a portion only of each revolution at a speed directly proportional to the speed of rotation of said magnet, a condenser, means for charging said condenser, circuit means interconnecting said reed switches and said condenser and distributor for discharging said condenser at predetermined times and means interconnected with said condenser to utilize each of said discharges for generating a pulse.

14. A pulse generator comprising an electric line, a condenser, means for charging said condenser, a start reed switch, a plurality of stop reed switches, a magnet, means for rotating said magnet past said switches, distributor means, apparatus for rotating said distributor means at a speed of rotation directly proportional to the speed of said magnet, means for discharging said condenser by connecting said start switch across said condenser for a portion of each revolution of said distributor, a plurality of distributor segments, means for successively connecting said segments to the condenser during said portion of each revolution of said distributor, means for discharging said condenser through predetermined ones of said stop switches by selectively interconnecting said segments to said stop switches, and means for transmitting an impulse over said line incident to each discharge of said condenser.

15. In combination in a telephone station calling device, an electric line, a condenser, means including said line and a source of electrical current at a remote point for establishing a predetermined potential condition across said condenser, a distributor, a plurality of switches, means for repeatedly and successively operating said switches to abruptly change said potential condition across said condenser, interconnecting means between said condenser and said line including said distributor and means for transmitting a pulse of energy from said condenser over said line incident to each abrupt change of potential across said condenser.

16. In combination in a telephone station, a calling device comprising an electric line, a condenser, means for establishing a predetermined voltage condition across said condenser, interconnecting means including a plurality of switches interconnected between said condenser and said line, means for operating said switches at predetermined times for abruptly changing said voltage condition across said condenser, means for transmitting a pulse over said line incident to each abrupt change of voltage across said condenser and apparatus for restoring said predetermined potential condition across said condenser after each abrupt change of voltage across said condenser.

CLARENCE A. LOVELL.
DAVID B. PARKINSON.

REFERENCES CITED

The following references are of record in the file of this patent:

UNITED STATES PATENTS

| Number | Name | Date |
|---|---|---|
| 1,834,934 | Brach | Dec. 8, 1931 |
| 1,972,289 | Chauvean | Sept. 4, 1934 |
| 2,004,114 | Hubbel | June 11, 1935 |
| 2,097,577 | Seitner | Nov. 2, 1937 |
| 2,199,443 | Ott | May 7, 1940 |
| 2,323,019 | Dohle | June 29, 1943 |
| 2,423,096 | Gilliver | July 1, 1947 |
| 2,459,858 | Westcott | Jan. 25, 1949 |
| 2,475,553 | McCreary | July 5, 1949 |